Aug. 30, 1949.                    W. FERRIS                    2,480,403
                              HYDRAULIC TRANSMISSION
Filed Aug. 28, 1944                                         3 Sheets-Sheet 1

INVENTOR
WALTER FERRIS
BY
ATTORNEY

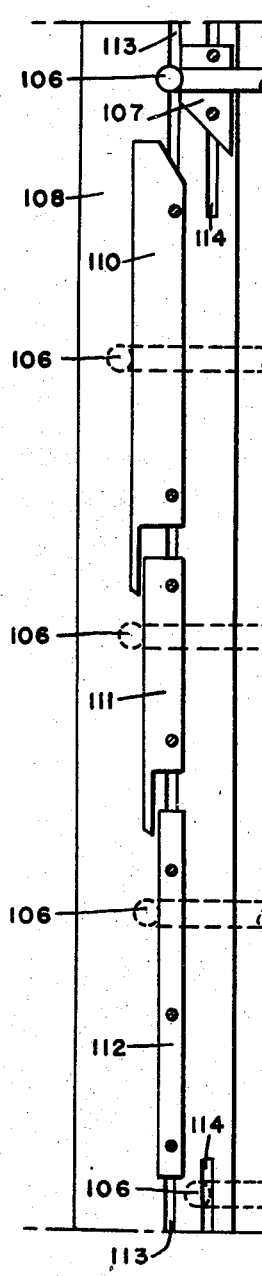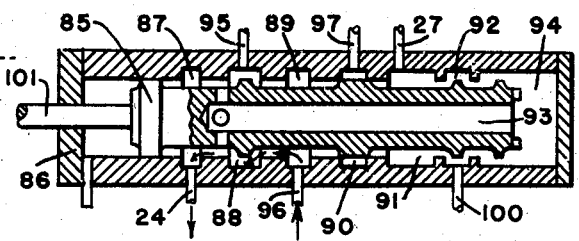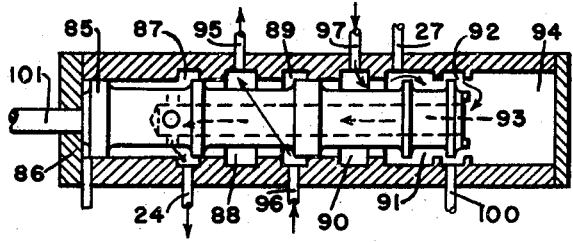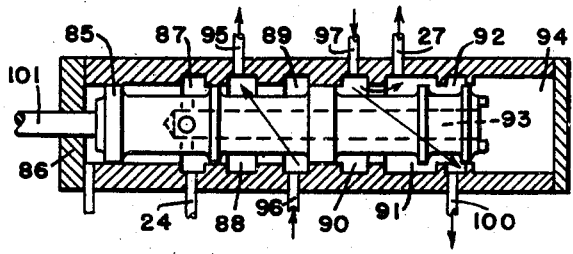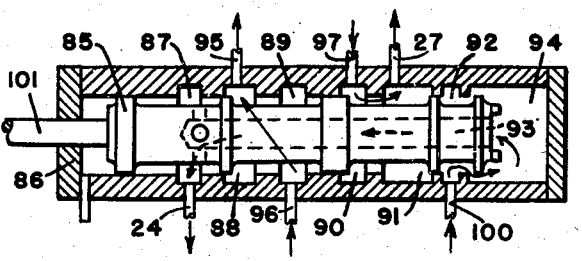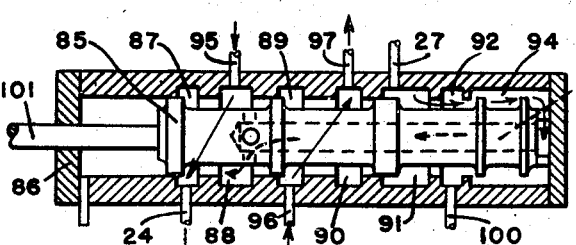

Aug. 30, 1949.  W. FERRIS  2,480,403
HYDRAULIC TRANSMISSION
Filed Aug. 28, 1944  3 Sheets-Sheet 3

INVENTOR
WALTER FERRIS
BY
Wesley P. Merrill
ATTORNEY

Patented Aug. 30, 1949

2,480,403

UNITED STATES PATENT OFFICE 2,480,403

HYDRAULIC TRANSMISSION

Walter Ferris, Milwaukee, Wis., assignor to The Oilgear Company, Milwaukee, Wis., a corporation of Wisconsin Application August 28, 1944, Serial No. 551,578

20 Claims. (Cl. 60—52)

This invention relates to hydraulic transmissions of the type in which the speed of the hydraulic motor is controlled by throttling the liquid and it has as an object to provide such a transmission including means for maintaining the motor speed exactly proportional to a reference speed.

Another object is to provide a speed control for a hydraulic motor to effect operation thereof at rapid traverse and feed rates alternately and including differential mechanism for automatically correcting errors in the feed rate and means for maintaining the adjustment of the differential mechanism unchanged from the end of one feeding phase of a cycle through the intervening rapid traverse phase to the beginning of the next feeding phase.

Other objects and advantages will be apparent from the description hereinafter given of a hydraulic transmission in which the invention is embodied.

The invention is exemplified by the transmission shown schematically in the accompanying drawings in which the views are as follows:

Figs. 2, 3, 4, 5 and 6 are views showing the several operative positions of the control valve shown in Fig. 1.

Fig. 7 is a view illustrating the positions of the cams for shifting the control valve from one to another of its several positions.

Figure 1:
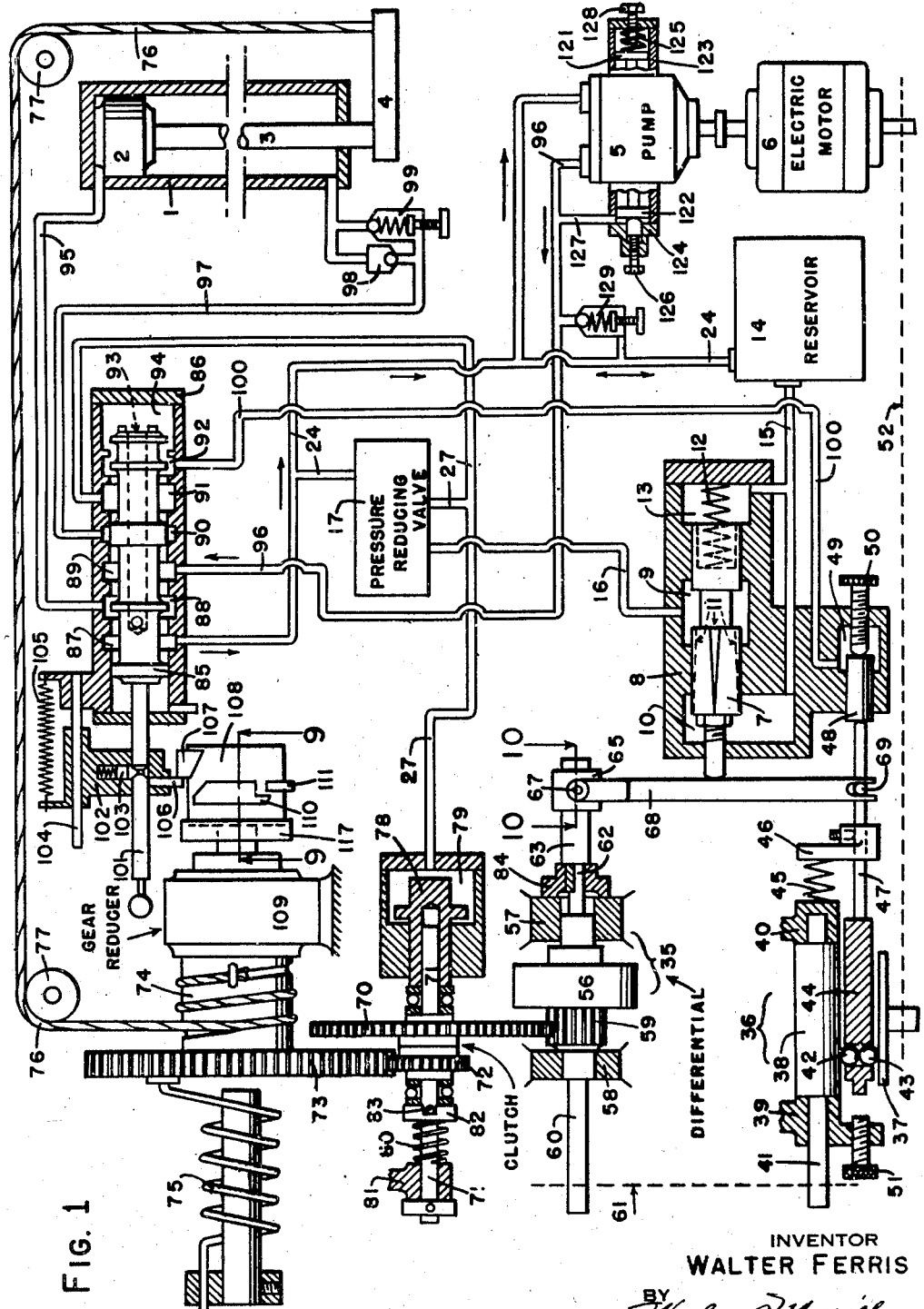
Fig. 1 is a hydraulic circuit diagram showing the relation between the several parts of the transmission.

The transmission may have a rotary motor but, for the purpose of illustration, it has been shown as having a reciprocating motor consisting primarily of a stationary cylinder 1 and a piston 2 fitted in cylinder 1 and connected by a rod 3 to a crosshead 4 or other movable element. Piston 2 is adapted to be moved in one direction or the other at rapid traverse rates and in one direction at feed rates by liquid supplied freely to one end or the other of cylinder 1 from a suitable source such as a pump 5 driven by an electric motor 6.

When motor 1—2 is operating at rapid traverse rates, the outflow therefrom is substantially unrestricted but, when it is operating at feed rate, the outflow therefrom and consequently the speed thereof is controlled by a throttle valve 7 which is fitted in a casing 8 and controls communication between an intake chamber 9 and a discharge chamber 10 formed therein. A plurality of tapered grooves 11 formed in the periphery of valve 7 coact with the wall of casing 10 to form a plurality of orifices through which liquid delivered from cylinder 1 to chamber 9 flows to discharge chamber 10. Valve 7 is held in adjusted positions and adapted to be moved toward the right by mechanism to be presently described and it is constantly urged toward the left by a spring 12 arranged within a spring chamber 13 formed in the right end of casing 8. Moving valve 7 toward the left or toward the right increases or decreases the orifice area or the effective areas of grooves 11.

The rate of flow through a throttle valve is substantially proportional to the drop in pressure thereacross subject to variations due to changes in the viscosity of the liquid, partial choking of the throttle by sediment in the working liquid etc. In order that the flow through grooves 11 and consequently the rate at which liquid is discharged from cylinder 1 may be substantially constant when valve 7 is in any given position, discharge chamber 10 is connected to drain, as by being connected to a reservoir 14 by a channel 15 which is also connected to spring chamber 13, and intake chamber 9 is connected by a channel 16 to a pressure reducing valve 17 which reduces the pressure of the incoming liquid to a constant low value so that the drop in pressure across the orifices remains substantially constant during the large fluctuations in working pressure which frequently occur.

Reducing valve 17 not only maintains a constant pressure in inlet chamber 9 so that the flow through grooves 11 is constant when valve 7 is stationary, but it also reduces the pressure to a low value, such as 30 p. s. i., so that grooves 11 may be made large enough to prevent them from becoming clogged with small particles of solid matter which accumulate in the motive liquid.

Figure 8:
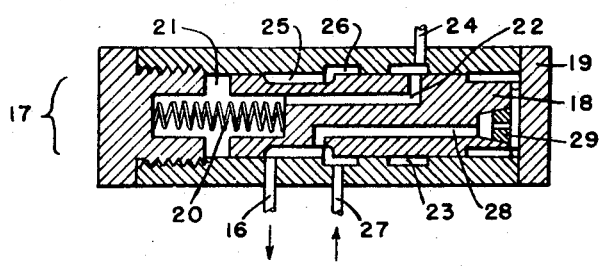
Fig. 8 is a central longitudinal section through the pressure reducing valve shown in Fig. 1.

As shown in Fig. 8, reducing valve 17 has a valve member 18 fitted in a casing 19 and urged against the right end thereof by spring 20 arranged in a spring chamber 21. A channel 22 formed in valve member 18 connects spring chamber 21 to a drain port 23 which is connected to reservoir 14 by a branched channel 24 so that the pressure in spring chamber 21 is atmospheric.

Channel 16 is connected to casing 19 in communication with a cannelure 25 formed in valve member 18 in communication with an annular port 26 to which liquid discharged from the lower end of cylinder 1 is directed through a channel 27. Cannelure 25 also communicates with a channel 28 which extends therefrom through the right end of valve member 18 and has a choke 29 arranged therein.

The arrangement is such that liquid discharged from motor 1—2 enters port 26 through channel 27 and then flows through cannelure 25 and channel 16 to throttle 7—8 which resists the flow of liquid therethrough and thereby causes pressure to rise. This pressure extends from cannelure 25 through channel 28 to the right end of casing 19 and moves valve member 18 toward the left against the resistance of spring 20, thereby reducing the opening between the adjacent edges of cannelure 25 and port 26 which edges form an orifice to throttle the flow and cause a drop in pressure thereacross. Valve member 18 will continue to move toward the left until the pressure in cannelure 25 and in the right end of casing 19 is such a low value, for example 30 p. s. i., that the force exerted by the liquid upon the right end of valve member 18 is equal to the resistance of spring 20.

When the pressure of the incoming liquid increases, the flow from port 26 to cannelure 25 tends to increase but throttle 7—8 resists an increase in the flow therethrough and thereby causes a momentary increase in the pressure in cannelure 25 and in the right end of casing 19. This momentary increase in pressure moves valve member 18 toward the left until the pressure in the right end of casing 19 and at the inlet of throttle 7 is again proportional to the resistance of spring 20.

When the pressure of the incoming liquid decreases, the flow from port 26 to cannelure 25 decreases and thereby causes a drop in the pressure acting upon the right end of valve member 18 which permits spring 20 to move valve member 18 toward the right to increase the opening between the adjacent edges of cannelure 25 and port 26 until the pressure acting upon the right end of valve member 18 is again proportional to the resistance of spring 20. Reducing valve 17 thus automatically adjusts itself to maintain a constant pressure at the inlet of throttle 7, and choke 29 slows down the movement of valve member 18 to prevent it from hunting.

Passing the outflow from a hydraulic motor through a throttle and maintaining a substantially constant pressure at the inlet of the throttle keeps the speed of the motor near enough to constant for some purposes but for other purposes the motor speed should be either constant or exactly proportional to a reference speed.

In order that the motor speed may be maintained proportional to a reference speed which may be constant, the present invention provides a differential 35 which has one leg driven at a speed proportional to the motor speed, a second leg driven at a speed proportional to a reference speed and its third leg adapted to adjust throttle valve 7 in response to a variation in the relative speeds of the first and second legs. Throttle valve 7 is adjusted to approximately establish a desired motor speed and then a variation in the motor speed relative to the reference speed will cause differential 35 to further adjust throttle valve 7 to correct such variation in motor speed.

In order that the motor speed may be varied relative to the reference speed, the second leg of differential 35 is driven through a control transmission 36 which may be adjusted to vary the speed of differential 35 relative to the reference speed. Transmission 36 is preferably of the friction type and, since such transmissions are well known, it has been shown schematically and only as much thereof illustrated as is necessary to an explanation of its functions.

As shown, transmission 36 includes a driven disk 37 which is suitably mounted for rotation, a cylindrical friction roller 38 which is journaled in stationary bearings 39 and 40 and provided with a shaft 41 for transmitting motion to differential 35, and a pair of transfer balls 42 and 43 arranged in a carriage 44 and interposed between disk 37 and roller 38. Disk 37 is urged by spring means, not shown, toward roller 38 to pinch balls 42 and 43 therebetween so that they can transmit motion from one to the other.

Carriage 44 is constantly urged toward the right by a spring 45 arranged between bearing 40 and an arm 46 fixed upon a rod 47 which is connected to or formed integral with carriage 44. Movement of carriage 44 toward the right is limited by the right end of rod 47 engaging a piston 48 which is fitted in a stationary cylinder 49 and normally held by spring 45 against an adjusting screw 50 threaded through the end of cylinder 49. Piston 48, when operated by liquid supplied to cylinder 49, will move carriage 44 toward the left into engagement with an adjusting screw 51 carried by bearing 39.

Disk 37 is driven at a reference speed to which the speed of the hydraulic motor is to be maintained proportional. If the motor speed is to be constant when the motor is operating at a feed rate, disk 37 may be driven by a synchronous motor but, since during the time the hydraulic motor is operating at a feed rate the speed of motor 6 remains substantially constant due to the fact that pump 5 is operating at short stroke and at a substantially constant pressure during that time, disk 37 has been shown as being driven by electric motor 6 through a drive 52 which has been indicated simply by a dotted line as any suitable drive will suffice.

Differential 35 has been shown schematically as it is of ordinary construction and an illustration thereof in detail is deemed unnecessary. One leg of differential 35 includes a housing 56 which is journaled in stationary bearings 57 and 58 and has a gear 59 fixed thereon and driven at a speed proportional to the speed of motor 1—2 through a drive to be presently described. A second leg of differential 35 includes a shaft 60 which extends through the left end of housing 56 and is driven from shaft 41 of transmission 36 through a drive 61 which has been indicated by a dotted line as any suitable drive will suffice.

Figure 10:
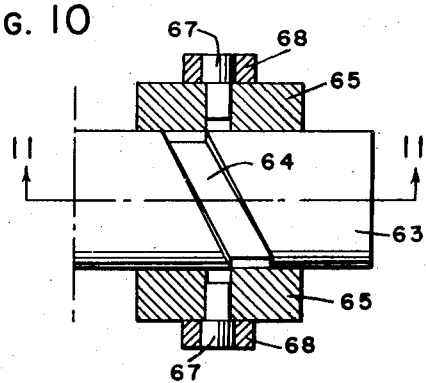
Fig. 10 is a view taken on a line 10—10 of Figs. 1 and 11.
Figure 11:
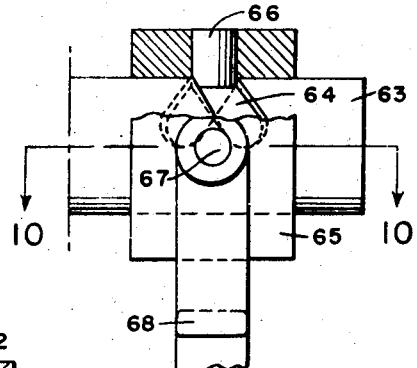
Fig. 11 is in part a side view and in part a section taken on the line 11—11 of Fig. 10.

The third leg of differential 35 includes a shaft 62 which extends through the right end of housing 56 and has fixed upon its outer end a cam 63 (Figs. 10 and 11) having a helical groove or cam slot 64 formed in its periphery. Cam 63 is rotatable within a sleeve 65 having a cam follower 66 fixed thereto and extending into cam slot 64. Sleeve 65 is connected by two diametrically opposed trunnions 67 to the forked upper end of a lever 68 which is engaged intermediate its ends by throttle valve 7 and has its lower end slotted and pivoted upon a pin 69 fixed to rod 47 as shown in Fig. 1.

The arrangement is such that a variation in the speed of housing 56 relative to the speed of shaft 60 will cause shaft 62 and cam 63 to rotate which will cause cam slot 64 to move sleeve 65 and the upper end of lever 68 toward the right or left. Lever 68 will pivot upon pin 69 and its intermediate portion will either move throttle valve 7 toward the right to decrease the effective areas of grooves 11 or it will permit spring 12 to move throttle valve 7 toward the left to increase the effective areas of grooves 11.

Gear 59 on differential housing 56 has been shown in mesh with a gear 70 which is journaled upon a stationary shaft 71 and adapted to be fixed for rotation with a gear 72 also journaled upon shaft 71. Gear 72 meshes with a gear 73 which is rotatable upon a stationary axis and has a sheave or cable drum 74 fixed thereto. Gear 73 is adapted to be rotated in one direction by a torsion spring 75 and it is adapted to be rotated in the opposite direction by motor 1—2 through a cable 76 which has one end connected to crosshead 4 and its other end portion wound upon and fixed to drum 74, cable 76 being passed over suitable deflector sheaves 77 if necessary.

The arrangement is such that, when piston 2 is advanced on a working stroke, crosshead 4 will unwind cable 76 from drum 74 which will cause gears 73, 72, 70 and 59 to rotate differential housing 56 in one direction at a speed proportional to the speed of piston 2 and will also cause sufficient energy to be stored in spring 75 to drive these gears in the opposite direction and maintain a tension in cable 76. When piston 2 is retracted, spring 75 will rotate gear 73 and drum 74 in the opposite direction to wind cable 76 upon drum 74, and cable 76 will maintain the speed of gear 73 proportional to the speed of piston 2.

In the transmission shown, motor 1—2 is adapted to operate at rapid traverse speed in opposite directions and to operate in one direction at feed rate which may be varied from zero to a predetermined maximum. As previously explained, throttle valve 7 is adjusted to cause motor 1—2 to operate at a predetermined feed rate and then any variation in that rate will cause differential 35 to adjust throttle valve 7 to correct such variation in speed.

In order that differential 35 may operate to maintain a feed rate constant or proportional to a reference speed, drives 52 and 61 are so proportioned that, with carriage 44 against fast feed adjusting screw 51, shaft 60 will be driven at a speed proportional to the speed at which differential housing 56 is driven when motor 1—2 is operating at a predetermined maximum feeding rate. Then by moving carriage 44 toward the right, the speed of motor 1—2 will be reduced until further movement of carriage 44 is prevented by screw 50 which determines the minimum feed rate of motor 1—2.

The minimum speed of differential housing 56 should be at least 3 or 4 R. P. M. in order to obtain a reasonably prompt differential adjustment of throttle valve 7 when motor 1—2 is operating at its minimum feed rate. Assuming that the speed of differential housing 56 is 4 R. P. M. at the minimum feed rate of one half inch per minute, that the maximum feed rate is 18 inches per minute and that the rapid traverse rate is 18 feet per minute, the speed of differential housing 56 will be 144 R. P. M. when motor 1—2 is operating at maximum feed rate and, if differential housing 56 were driven during rapid traverse of motor 1—2, its speed would be 12 times its speed during maximum feed.

The speeds of shaft 60 and differential housing 56 are proportional to each other at all feed rates, but changing the speed of motor 1—2 from feed to rapid traverse does not cause a corresponding change in the speed of shaft 60. Therefore, if housing 56 were driven during rapid traverse of motor 1—2, the large difference between its speed and the speed of shaft 60 would cause breakage to occur in differential 35 or slippage to occur in transmission 36. In order to avoid such a condition, the adjacent hubs of gears 70 and 72 are adapted to form a friction clutch which enables gear 72 to rotate gear 70 during feed and to rotate without rotating gear 70 during rapid traverse.

As shown, gear 70 is adapted to be pressed against gear 72 by a piston 78 fitted in a stationary cylinder 79 to which pressure liquid is supplied through channel 27 only during feed. Movement of gear 70 along shaft 71 is resisted by a spring 80 arranged around shaft 71 between a bearing 81 and a collar 82 which is slideable upon shaft 71 and has a suitable notch formed therein to receive a pin 83 fixed in shaft 71.

The arrangement is such that, when pressure liquid is supplied to cylinder 79, piston 78 will press gear 70 against gear 72 and move both gears along shaft 71 against the resistance of spring 80 until further movement of piston 78 is arrested by its head engaging the end of cylinder 79. Gear 72 is thus pressed against gear 70 by a force proportional to the resistance of spring 80 and the friction between the adjacent hubs of gears 72 and 70 enables gear 72 to drive gear 70. When cylinder 79 is connected to drain, spring 80 will move collar 82 and gears 72 and 70 along shaft 71 until collar 82 engages pin 83 and then there is no force to press gears 72 and 70 together and gear 72 may rotate without rotating gear 70 so that differential housing 56 is not driven by gear 70 during rapid traverse of motor 1—2.

Due to frequent alternation between rapid traverse and feeding operations in such machines as machine tools to which the present device is applicable, it is essential that the differential corrections in the position of valve 7 made during the feeding phase of a cycle be maintained during the succeeding rapid traverse phase while clutch 70—72 is disengaged. The duration of the feeding phase in many set-ups is quite short, and if valve 7 were permitted to revert each time to its manually adjusted position, the entire feeding period might elapse before the differential correction was completed and the feed rate corrected.

In order to retain throttle valve 7 in its adjusted position during rapid traverse, a brake 84 is slideably splined upon shaft 62 between bearing 57 and cam 63. Brake 84 is pressed against bearing 57 by spring 12 which exerts sufficient force to enable brake 84 to hold shaft 62 stationary during rapid traverse but not enough force to prevent shaft 62 from readily rotating in response to a variation in the relative speeds of shaft 60 and differential housing 56 during feed.

Operation of motor 1—2 is controlled primarily by valve means which is adjustable to direct liquid from pump 5 to one end or the other of cylinder 1, to direct the outflow from cylinder 1 to pressure reducing valve 17, to direct pressure liquid to cylinders 49 and 79 and to cut off flow to both ends of cylinder 1 simultaneously. The valve means may assume various forms but it has been shown as including a control valve 85 which is fitted in a casing 86 and controls communication between six annular grooves or ports 87, 88, 89, 90, 91 and 92 formed in the wall of casing 86. Valve 85 has a passage 93 extending therethrough from the right end thereof and opening into casing 86 near the left end thereof so that it is always in communication with port 87 to which drain channel 24 is connected. A chamber 94 of substantially the same diameter as the ports is formed in the right end of casing 86 to permit liquid to flow from certain ports through passage 93 to drain channel 24.

Port 88 is connected by a channel 95 to the upper end of cylinder 1, port 89 is connected by a channel 96 to the outlet of pump 5 and port 90 is connected to the lower end of cylinder 1 by a channel 97 having a check valve 98 and a resistance valve 99 connected therein in parallel with each other and opening in opposite directions. Check valve 98 permits liquid to flow freely into cylinder 1 but prevents discharge of liquid therefrom except through resistance valve 99 which offers sufficient resistance to the discharge of liquid to prevent piston 2 from moving when the transmission is idle. Port 91 has channel 27 connected thereto and port 92 is connected by a channel 100 to cylinder 49.

Valve 85 has a stem 101 fixed to its left end and extending through a block 102 to which it is releasably connected by a detent 103. Block 102 is slidable upon a stationary rod 104 and urged toward the right by a spring 105 so that valve 85 is constantly urged toward the right when stem 101 is connected to block 102 by detent 103.

When valve 85 is in the position shown in Figs. 1 and 2, motor 1—2 is idle and a cam roller 106 journaled in block 102 is in engagement with a neutral cam 107 carried by a cam drum 108 which is driven through a gear reducer 109 from cable drum 74 so that operation of motor 1—2 causes cam drum 108 to rotate through an angular distance exactly proportional to the linear distance through which crosshead 4 is moved. Total angular travel of cam drum 108 must not exceed one full revolution.

Cam drum 108 also has arranged thereon a rapid traverse cam 110, a fast feed cam 111 and a slow feed cam 112 which cam roller 106 is adapted to engage in succession as indicated in Fig. 7. When roller 106 is in engagement with cam 110, valve 85 is in the position shown in Fig. 3 and piston 2 will be advanced at rapid traverse rate. During rotation of drum 108, roller 106 will move into engagement with cams 111 and 112 successively and spring 105 will move valve 85 successively into the positions shown in Figs. 4 and 5 which will cause piston 2 to be advanced first at a fast feed rate and then at a slow feed rate. During continued rotation of cam drum 108, roller 106 will move out of engagement with the cams and spring 105 will move valve 85 to the position shown in Fig. 6 which will cause piston 2 to be retracted at rapid traverse rate.

Figure 9:
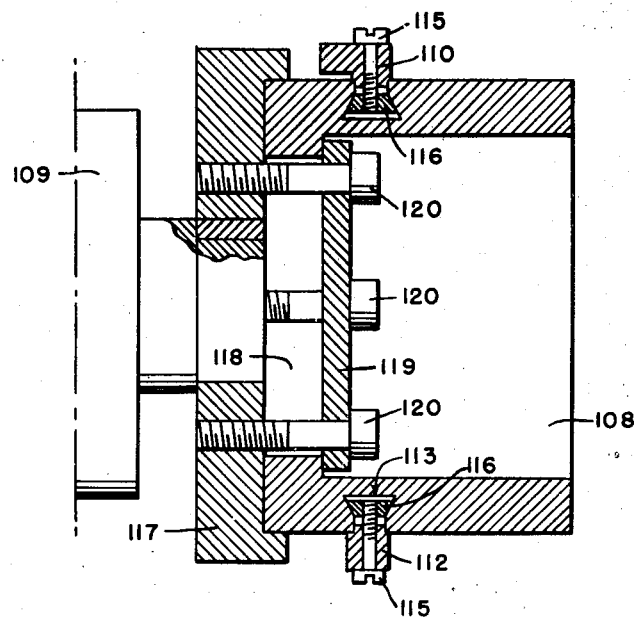
Fig. 9 is a section through the drum which carries the cams illustrated schematically in Fig. 7, the view being taken on a line 9—9 of Fig. 1.

Cams 107, 110, 111 and 112 are circular segments and are fitted into under cut slots 113 and 114 which are formed in the peripheral wall of drum 108 as shown in Figs. 7 and 9. Each cam is clamped in position by screws 115 extending therethrough and threaded into nuts 116 which are arranged in the under cut portion of the slot in which the cam is fitted. The length of each of cams 110, 111 and 112 is approximately proportional to the required movement of crosshead 4 which that cam is to control. For example, the length of rapid traverse cam 110 is proportional to the distance through which crosshead 4 moves during rapid traverse forward. Minor adjustments in rapid traverse stroke and feed strokes may be made by shifting the cam segments in grooves 113, each cam segment being made to overlap the adjacent segment for that purpose as indicated in Fig. 7.

Motor 1—2 may be operated at substantially its full stroke but it is ordinarily operated at a shorter stroke and, in order to select the range in which piston 2 reciprocates, cam drum 108 may be rotated relatively to the output shaft of gear reducer 109. As shown in Fig. 9, the output shaft of gear reducer 109 has a socket 117 rigidly secured thereto and cam drum 108 is fitted in socket 117 and provided at its lower end with an internal annular flange 118 which is engaged by a plate 119. A plurality of bolts 120 extend through plate 119 and are threaded into socket 117 to clamp cam drum 108 firmly to socket 117. The arrangement is such that, after the cams have been clamped in position upon drum 108, bolts 120 may be loosened and drum 108 rotated relative to socket 117 and then clamped in a desired position by tightening bolts 120.

If motor 1—2 were operated by liquid supplied thereto by a constant displacement pump, the entire output of the pump would be utilized during rapid traverse of motor 1—2 and there would be no loss of power but when motor 1—2 was operated at a feed rate, only a small part of the liquid discharged by the pump would be utilized in driving the motor and the balance would be exhausted through a relief valve which would waste considerable power and cause the liquid to become heated.

If motor 1—2 were operated by liquid supplied thereto from a pump of the well known pressure responsive type which delivers liquid at a predetermined maximum rate until pump pressure reaches a predetermined maximum and then it reduces its displacement until it is delivering just enough liquid to maintain that maximum pressure constant, there would be no appreciable loss of power or heating of the liquid but it would be necessary for the pump to operate at a displacement near zero when motor 1—2 was operating a minimum feed rate and such pumps are inclined to hunt when operating at a displacement near zero.

In order to avoid hunting of the pump and also avoid loss of a substantial amount of power, pump 5 is provided with a control which enables it to deliver at a predetermined maximum rate until pressure reaches a predetermined maximum and to then reduce its delivery to a minimum rate which is great enough to operate motor 1—2 at fast feed rate. When motor 1—2 is operating at slow feed rate, the liquid discharged by the pump in excess of motor requirements is exhausted through a relief valve but the rate at which liquid is exhausted through the relief valve is so small relative to the maximum rate of pump delivery that the loss of power and the resultant heating of the liquid are practically negligible.

For example, the displacement varying mechanism of pump 5 may include two pistons 121 and 122 arranged, respectively, in two cylinders 123 and 124 which are fixed to opposite sides of the pump casing. A spring 125 arranged between piston 121 and the end of cylinder 123 urges pistons 121 and 122 toward the left to increase pump displacement and it tends to hold piston 122 against an adjusting screw 126 which is threaded through the end of cylinder 124 and determines the maximum displacement of the pump. Piston 122 is adapted to be moved toward the right to decrease pump displacement by liquid supplied to the outer end of cylinder 124 through a channel 127 from channel 96. The movement of piston 122 toward the right is limited by piston 121 engaging an adjusting screw 128 threaded through the end of cylinder 123 and determining the minimum pump displacement which is kept great enough to enable pump 5 to deliver liquid at a rate sufficient to operate motor 1—2 at a maximum feed rate. When motor 1—2 is operating at a feed rate less than maximum, the liquid discharged by pump 5 is exhausted through a relief valve 129 which is connected between channels 96 and 24 and is adapted to open at a high pressure such as 1000 p. s. i.

*Operation*

With motor 6 and pump 5 running and with cam roller 106 in engagement with cam 107 so that control valve 85 is in the position shown in Figs. 1 and 2, the liquid discharged by pump 5 will flow through channel 96, valve casing 86, and channel 24 to reservoir 14 so that motor 1—2 is idle, piston 2 being held up by liquid trapped in the lower part of cylinder 1 by resistance valve 99.

As soon as motor 6 starts to drive pump 5, it also starts to drive shaft 60 of differential 35. At this time there is no pressure in cylinder 79 to cause the clutch to be engaged so that brake 84 holds shaft 62 stationary and the motion imparted to shaft 60 causes housing 56 to rotate and gear 59 to drive gear 70 which will rotate idly upon shaft 71.

To start the transmission, the operator pulls valve stem 101 outward to the limit of its movement, thereby moving valve 85 to the position shown in Fig. 3 so that port 88 is open to port 89 and port 97 is open to passage 93. The liquid discharged by pump 5 will then flow through channel 96, valve casing 86, and channel 95 to the upper end of cylinder 1 and cause piston 2 to advance and expel liquid from cylinder 1 through resistance valve 99, channel 97, valve casing 86, passage 93 in valve 85, port 87 and channel 24 to reservoir 14. Pump 5 is at this time delivering liquid at a predetermined maximum rate to cause piston 2 to advance at a predetermined rapid traverse speed and pump pressure is just sufficient to overcome the resistance of valve 99 and the inertia and friction of piston 2 and the parts connected thereto.

Piston 2 will advance crosshead 4 which will cause cable 76 to rotate cable drum 74 and thereby cause gear reducer 109 to rotate cam drum 108 and gear 73 to rotate gear 72. Since the clutch is not engaged at this time, rotation of gear 72 has no effect upon differential 35. Just after drum 108 starts to rotate, it moves cam 110 behind roller 106 and then the operator may release stem 101 as cam 110 will hold valve 85 in the position shown in Fig. 3.

Piston 2 will continue to advance at rapid traverse rate until cam drum 108, which rotates at a speed proportional to the speed of piston 2 as previously explained, has moved cam 110 beyond cam roller 106 and then spring 105 will shift valve 85 toward the right into the position shown in Fig. 4 and roller 106 will engage cam 111 and hold the valve 85 in that position.

With valve 85 in the position shown in Fig. 4, port 88 will remain open to port 89 so that liquid from pump 5 will continue to flow to the upper end of cylinder 1 and move piston 2 downward but port 90 will be closed to passage 93 which will cause the following things to occur substantially simultaneously:

1. The liquid discharged from cylinder 1 into channel 97 can no longer flow freely to reservoir 14 but must flow from channel 97 through valve casing 86, channel 27, pressure reducing valve 17, channel 16, throttle 7—8 and channel 15 into reservoir 14. Throttle 7—8 will resist the flow of liquid therethrough but pump 5 will continue to deliver liquid to the upper end of cylinder 1 which will cause pump pressure to rise and piston 2 to create a back pressure in the lower end of cylinder 1 and in all channels connected thereto.

2. The back pressure will extend into pressure reducing valve 17 and cause it to throttle the flow therethrough and thereby maintain the pressure at the inlet of throttle 7—8 at a constant low value as previously explained.

3. The back pressure will extend from valve casing 86 through channel 100 to cylinder 49 and cause piston 48 to move rod 47 and carriage 44 toward the left until carriage 44 engages adjusting screw 51, thereby so adjusting transmission 36 that it will drive shaft 60 at the correct speed for fast feed operation of motor 1—2.

4. The lower end of lever 68 will move with rod 47 and permit spring 12 to move throttle valve 7 to its fast feed position which may be varied by turning adjusting screw 51.

5. The back pressure will extend through channel 27 to cylinder 79 and cause piston 78 to engage the clutch so that gear 70 will be driven by gear 72 and it will drive differential housing 56 at a speed proportional to the speed of piston 2.

6. Pump pressure will extend through channel 127 to cylinder 124 and cause piston 122 to reduce the displacement of pump 5 to the minimum determined by adjusting screw 128 at which displacement pump 5 will deliver at a rate sufficient to cause piston 2 to advance at the fast feed rate determined by the adjustment of throttle 7.

Shifting valve 85 from the position shown in Fig. 3 to the position shown in Fig. 4 thus automatically causes the speed of motor 1—2 to be changed from rapid traverse to a desired fast feed rate, control transmission 36 to be adjusted so as to drive one leg of differential 35 at a speed proportional to the desired fast feed rate, a second leg of differential 35 to be driven at a speed proportional to the speed of motor 1—2 and the volumetric delivery of pump 5 to be reduced to a minimum which is great enough to drive motor 1—2 at the desired fast feed rate. If the speed of motor 1—2 should vary from the desired feed rate, the speed of differential housing 56 would vary relative to the speed of shaft 60 and cause shaft 62 to rotate and effect adjustment of throttle valve 7 to correct such variation in the speed of motor 1—2.

Motor 1—2 will continue to operate at the fast feed rate and cam drum 108 will continue to rotate until it moves cam 111 beyond cam roller 106 and then spring 105 will shift valve 85 to the position shown in Fig. 5 and cam roller 106 will engage cam 112 and hold valve 85 in that position.

Shifting valve 85 from the position shown in Fig. 4 to the position shown in Fig. 5 blocks communication between port 92 and port 91 and opens port 92 to chamber 94 which destroys the pressure in cylinder 49 and permits spring 45 to move control rod 47, carriage 44, and piston 48 toward the right until piston 48 engages adjusting screw 50, liquid being expelled from cylinder 49 by piston 48 through channel 100, valve casing 86, passage 93, port 87 and channel 24 into reservoir 14.

Moving control rod 47 toward the right causes lever 68 to move throttle valve 7 toward the right to reduce the effective areas of grooves 11 and thereby reduce the speed of motor 1—2 to a desired slow feed rate as determined by the adjustment of screw 50. Moving carriage 44 toward the right causes control transmission 36 to reduce the speed of shaft 60 to the correct speed for the desired slow feed operation of motor 1—2.

Shifting valve 85 from the position shown in Fig. 4 to the position shown in Fig. 5 makes no other change in the circuit. Pump 5 continues to deliver liquid to the upper end of cylinder 1 and the liquid discharged from the lower end of cylinder 1 continues to flow through throttle 7—8 which now reduces the speed of motor 1—2 so that the liquid discharged by pump 5 is in excess of motor requirements and the excess is exhausted through relief valve 129. The back pressure continues to hold the clutch engaged so that differential housing 56 continues to be driven at a speed proportional to the speed of motor 1—2 and, if the speed of motor 1—2 should vary from the desired feed rate, the speed of differential housing 56 would vary relative to the speed of shaft 60 and cause shaft 62 to rotate and effect adjustment of throttle valve 7 to correct such variation in speed as previously explained.

Motor 1—2 will continue to operate at the slow feed rate and cam drum 108 will continue to rotate until it moves cam 112 beyond cam roller 106 and then spring 105 will shift valve 85 toward the right to the limit of its movement as shown in Fig. 6.

With valve 85 in the position shown in Fig. 6, port 89 is open to port 90 so that the liquid discharged by pump 5 may flow through channel 96, valve casing 86, channel 97 and check valve 98 to the lower end of cylinder 1 and cause piston 2 to move upward and eject liquid from the upper end of cylinder 1. Port 88 is open to port 87 so that the liquid ejected from cylinder 1 may flow through channel 95, valve casing 86 and channel 24 to reservoir 14. Port 91 is open to chamber 94 so that liquid may escape from cylinder 79 through channel 27, valve casing 86, passage 93 and channel 24 into reservoir 14 and thereby render gear 73 ineffective to drive differential housing 56.

Motor 1—2 is thus reversed which causes pump pressure to drop to a low value and permit spring 125 to increase the displacement of pump 5 to the predetermined maximum so that piston 2 is retracted at rapid traverse speed. As piston 2 retracts, torsion spring 75 will rotate gear 73 and drums 74 and 108 in a direction opposite to the direction in which they rotate during advance of piston 2. Drum 74 will wind cable 76 thereon and thereby maintain the speed and total angular movements of gear 73 and drums 74 and 108 proportional to the speed and total linear movement of piston 2. Gear 72 will be driven by gear 73 but it cannot drive gear 70 as the clutch is not engaged at this time.

Retraction of piston 2 and rotation of gear 73 and drums 74 and 108 will continue until cam 107 on drum 108 engages cam roller 106 and shifts valve 85 to the position shown in Figs. 1 and 2 to bypass pump 5 as previously explained. The transmission will then come to rest with its parts in the positions occupied before the above described cycle of operations was initiated.

The invention herein set forth is susceptible of various modifications and adaptations without departing from the scope of the invention which is hereby claimed as follows:

1. The combination with an element adapted to move at a predetermined speed, of a hydraulic transmission comprising a hydraulic motor, means for supplying liquid to said motor to energize the same, a throttle for controlling the outflow from said motor to thereby control the speed of said motor, and means responsive to a variation in the speed of said motor relative to the speed of said element for adjusting said throttle to vary the resistance thereof and thereby correct said variation in motor speed.

2. The combination with an element adapted to move at a predetermined speed, of a hydraulic transmission comprising a hydraulic motor, means for supplying liquid to said motor to energize the same, a throttle for controlling the speed of said motor, means responsive to a variation in the speed of said motor relative to the speed of said element for adjusting said throttle to vary the resistance thereof and thereby correct said variation in motor speed, and means responsive to said motor completing a given movement for adjusting said throttle to vary the resistance thereof and thereby vary the speed of said motor.

3. The combination with an element adapted to move at a plurality of predetermined speeds, of a hydraulic transmission comprising a hydraulic motor, means for supplying liquid to said motor to energize the same, a throttle for controlling the speed of said motor, means for automatically adjusting said throttle from one to another of a plurality of positions in each of which it establishes a predetermined speed of said motor, means for changing the speed of said element from one to another of said predetermined speeds substantially simultaneously with the adjustment of said throttle, and means responsive to a variation in the speed of said motor relative to the speed of said element for further adjusting said throttle to thereby correct said variation in motor speed.

4. A hydraulic transmission comprising a hydraulic motor, a pump for supplying liquid to said motor to energize the same, a relief valve for the discharge of liquid delivered by said pump in excess of motor requirements, a control for reducing the delivery of said pump to a predetermined minimum rate in response to pump pressure reaching a given maximum to thereby prevent an excessive volume of liquid from being discharged through said relief valve, a throttle for resisting the discharge of liquid from said motor, the resistance offered by said throttle causing said pump to create pressure which effects operation of said control, and a valve for bypassing the outflow from said motor around said throttle to enable said pump to operate said motor at high speed.

5. The combination with an element adapted to move at a predetermined speed, of a hydraulic transmission comprising a hydraulic motor, means for supplying liquid to said motor to energize the same, a throttle for resisting the flow of liquid through said motor, a control valve for controlling said motor and adapted in one position to bypass the liquid around said throttle to enable said motor to operate at high speed and adapted in another position to direct said liquid through said throttle to enable said throttle to control the speed of said motor, means responsive to said valve being shifted to the second mentioned position for adjusting said throttle to a predetermined position, and means responsive to a variation in the speed of said motor relative to the speed of said element for further adjusting said throttle to thereby correct said variation in motor speed.

6. A hydraulic transmission comprising a hydraulic motor, a pump for supplying liquid to said motor to energize the same, a throttle for limiting the rate of discharge of liquid from said motor to thereby control the speed of said motor, a pressure reduction valve interposed between said throttle and said motor for reducing the pressure of the liquid delivered to said throttle to a substantially constant value, a relief valve for the discharge of liquid delivered by said pump in excess of motor requirements, a control for reducing the delivery of said pump to a predetermined minimum rate in response to pump pressure reaching a given maximum to thereby prevent an excessive volume of liquid from being discharged through said relief valve the resistance offered by said throttle causing said pump to create pressure to effect operation of said control, and means responsive to movement of said motor for adjusting said throttle to vary the rate of flow therethrough and thereby vary the speed of said motor.

7. The combination with an element adapted to move at a predetermined speed, of a hydraulic transmission comprising a hydraulic motor, means for supplying liquid to said motor to energize the same, a throttle for resisting the flow of liquid through said motor, a control valve for controlling said motor and adapted in one position to bypass the liquid around said throttle to enable said motor to operate at high speed and adapted in another position to direct said liquid through said throttle to enable said throttle to control the speed of said motor, means responsive to said valve being shifted to the second mentioned position for adjusting said throttle to a predetermined position, means for shifting said valve, means responsive to movement created by said motor for operating said valve shifting means, and means responsive to a variation in the speed of said motor relative to the speed of said element for further adjusting said throttle to thereby correct said variation in motor speed.

8. The combination with an element adapted to move at a predetermined speed, of a hydraulic transmission comprising a hydraulic motor, means for supplying liquid to said motor to energize the same, a throttle for controlling the speed of said motor, means for rendering said throttle effective or ineffective to control said motor, a differential having one leg driven from said element at a speed proportional to the speed thereof, a drive for driving the second leg of said differential from said motor at a speed proportional to the speed thereof to thereby cause the third leg of said differential to operate in response to a variation in the speed of said motor relative to the speed of said element, means responsive to operation of said third leg for adjusting said throttle to cause it to correct said variation in motor speed, said drive including a clutch for preventing said drive from driving said differential when said throttle is ineffective to control said motor, and means for causing said clutch to be engaged only during the time said throttle is effective.

9. The combination with an element adapted to move at a predetermined speed, of a hydraulic transmission comprising a hydraulic motor, means for supplying liquid to said motor to energize the same, a throttle for controlling the speed of said motor, means for rendering said throttle effective or ineffective to control said motor, a differential having one leg driven from said element at a speed proportional to the speed thereof, a drive for driving the second leg of said differential from said motor at a speed proportional to the speed thereof to thereby cause the third leg of said differential to operate in response to a variation in the speed of said motor relative to the speed of said element, means responsive to operation of said third leg for adjusting said throttle to cause it to correct said variation in motor speed, said drive including a clutch for preventing said drive from driving said differential when said throttle is ineffective to control said motor, means for causing said clutch to be engaged only during the time said throttle is effective, and a brake for preventing operation of the third leg of said differential during disengagement of said clutch.

10. The combination with an element adapted to move at a predetermined speed, of a hydraulic transmission comprising a hydraulic motor, means for supplying liquid to said motor to energize the same, a throttle for controlling the speed of said motor, means for rendering said throttle effective or ineffective to control said motor, a differential having one leg driven from said element at a speed proportional to the speed thereof, a drive for driving the second leg of said differential from said motor at a speed proportional to the speed thereof to thereby cause the third leg of said differential to operate in response to a variation in the speed of said motor relative to the speed of said element, means responsive to operation of said third leg for adjusting said throttle to cause it to correct said variation in motor speed, means for varying the speed of the first leg of said differential relative to the speed of said element, and means responsive to said throttle being rendered effective for simultaneously adjusting said throttle and said speed varying means.

11. The combination with an element adapted to move at a predetermined speed, of a hydraulic transmission comprising a hydraulic motor, means for supplying liquid to said motor to energize the same, a throttle for controlling the speed of said motor, means for rendering said throttle effective or ineffective to control said motor, a differential having one leg driven from said element at a speed proportional to the speed thereof, a drive for driving the second leg of said differential from said motor at a speed proportional to the speed thereof to thereby cause the third leg of said differential to operate in response to a variation in the speed of said motor relative to the speed of said element, means responsive to operation of said third leg for adjusting said throttle to cause it to correct said variation in motor speed, means for varying the speed of the first leg of said differential relative to the speed of said element, means responsive to said throttle being rendered effective for adjusting said throttle to a position to cause said motor to operate at one controlled speed and for simultaneously adjusting said speed varying means, and means responsive to said motor completing a given movement for adjusting said throttle to a different position to cause said motor to operate at another controlled speed and for simultaneously adjusting said speed varying means.

12. The combination with an element adapted to move at a predetermined speed, of a hydraulic transmission comprising a hydraulic motor, means for supplying liquid to said motor to energize the same, a throttle for resisting the discharge of liquid from said motor to thereby control the speed of said motor, a pressure reduction valve interposed between said throttle and said motor for reducing the pressure of the liquid delivered to said throttle to a substantially constant value, and means responsive to a variation in the speed of said motor relative to the speed of said element for adjusting said throttle to vary the resistance thereof and thereby correct said variation in motor speed.

13. The combination with an element adapted to move at a plurality of predetermined speeds, of a hydraulic transmission comprising a hydraulic motor, means for supplying liquid to said motor to energize the same, a throttle for resisting the discharge of liquid from said motor to thereby control the speed of said motor, a pressure reduction valve interposed between said throttle and said motor for reducing the pressure of the liquid delivered to said throttle to a substantially constant value, means for automatically adjusting said throttle from one to another of a plurality of positions in each of which it establishes a predetermined speed of said motor, means for changing the speed of said element from one to another of said predetermined speeds substantially simultaneously with the adjustment of said throttle, and means responsive to a variation in the speed of said motor relative to the speed of said element for further adjusting said throttle to thereby correct said variation in motor speed.

14. The combination with an element adapted to move at a predetermined speed, of a hydraulic transmission comprising a hydraulic motor, a pump for supplying liquid to said motor to energize the same, a throttle for resisting the flow of liquid through said motor, means responsive to a variation in the speed of said motor relative to the speed of said element for adjusting said throttle to vary the resistance thereof and thereby correct said variation in motor speed, and a control responsive to pump pressure reaching a given maximum for reducing the delivery of said pump substantially to the rate required to operate said motor at the speed determined by said throttle.

15. The combination with an element adapted to move at a predetermined speed, of a hydraulic transmission comprising a hydraulic motor, a pump for supplying liquid to said motor to energize the same, a throttle for resisting the flow of liquid through said motor, means responsive to a variation in the speed of said motor relative to the speed of said element for adjusting said throttle to vary the resistance thereof and thereby correct said variation in motor speed, a control responsive to pump pressure reaching a given maximum for reducing the delivery of said pump substantially to the rate required to operate said motor at the speed determined by said throttle, and a valve for bypassing said liquid around said throttle to enable said pump to operate said motor at high speed.

16. The combination with an element adapted to move at a predetermined speed, of a hydraulic transmission comprising a hydraulic motor, a pump for supplying liquid to said motor to energize the same, a throttle for resisting the discharge of liquid from said motor, means responsive to a variation in the speed of said motor relative to the speed of said element for adjusting said throttle to vary the resistance thereof and thereby correct said variation in motor speed, a control responsive to pump pressure reaching a given maximum for reducing the delivery of said pump substantially to the rate required to operate said motor at the speed determined by said throttle, a valve for bypassing the outflow from said motor around said throttle to enable said pump to operate said motor at high speed, and means responsive to said motor completing a given movement for shifting said valve.

17. The combination with an element adapted to move at a predetermined speed, of a hydraulic transmission comprising a hydraulic motor, a pump for supplying liquid to said motor to energize the same, a throttle for resisting the flow of liquid through said motor, means responsive to a variation in the speed of said motor relative to the speed of said element for adjusting said throttle to vary the resistance thereof and thereby correct said variation in motor speed, a control responsive to pump pressure reaching a given maximum for reducing the delivery of said pump substantially to the rate required to operate said motor at the speed determined by said throttle, and means responsive to said motor completing a given movement for adjusting said throttle to vary the resistance thereof and thereby vary the speed of said motor.

18. A hydraulic transmission comprising a hydraulic motor, a pump for supplying liquid to said motor to energize the same, a throttle for resisting the discharge of liquid from said motor, a relief valve for the discharge of liquid delivered by said pump in excess of motor requirements, and a control for reducing the delivery of said pump to a predetermined minimum rate in response to pump pressure reaching a given maximum to thereby prevent an excessive volume of liquid from being discharged through said relief valve.

19. A hydraulic transmission comprising a hydraulic motor, a pump for supplying liquid to said motor to energize the same, a throttle for resisting the discharge of liquid from said motor, a relief valve for the discharge of liquid delivered by said pump in excess of motor requirements, a control for reducing the delivery of said pump to a predetermined minimum rate in response to pump pressure reaching a given maximum to thereby prevent an excessive volume of liquid from being discharged through said relief valve, and means responsive to said motor completing a given movement for adjusting said throttle to vary the resistance thereof and thereby vary the speed of said motor.

20. A hydraulic transmission comprising a hydraulic motor, a pump for supplying liquid to said motor to energize the same, a throttle for resisting the discharge of liquid from said motor, a pressure reduction valve interposed between said throttle and said motor for reducing the pressure of the liquid delivered to said throttle to a substantially constant value, a relief valve for the discharge of liquid delivered by said pump in excess of motor requirements, a control for reducing the delivery of said pump to a predetermined minimum rate in response to pump pressure reaching a given maximum to thereby prevent an excessive volume of liquid from being discharged through said relief valve, a valve adapted in one position to bypass the outflow from said motor around said throttle to enable said pump to operate said motor at high speed, and means responsive to said motor completing a given movement for shifting said valve to another position in which it directs the outflow from said motor through said throttle to effect a reduction in the speed of said motor and thereby cause said pump to create a pressure which will enable said control to reduce the rate of pump delivery.

WALTER FERRIS.

REFERENCES CITED

The following references are of record in the file of this patent:

UNITED STATES PATENTS

| Number | Name | Date |
|---|---|---|
| 1,741,833 | Ferris | Dec. 31, 1929 |
| 1,982,711 | Vickers | Dec. 4, 1934 |
| 2,069,230 | Ferris | Feb. 2, 1936 |
| 2,080,810 | Douglas | May 18, 1937 |
| 2,148,348 | Groene et al. | Feb. 21, 1939 |
| 2,211,692 | Ferris | Aug. 13, 1940 |
| 2,274,603 | Herman et al. | Feb. 24, 1942 |
| 2,291,011 | Vickers | July 28, 1942 |
| 2,331,218 | Montelius | Oct. 5, 1943 |